(12) United States Patent
Murphy

(10) Patent No.: US 9,416,832 B1
(45) Date of Patent: Aug. 16, 2016

(54) HALF SYSTEM TORQUE BRAKES

(71) Applicant: The Boeing Company, Chicago, IL (US)

(72) Inventor: Robert M. Murphy, Everett, WA (US)

(73) Assignee: The Boeing Company, Chicago, IL (US)

( * ) Notice: Subject to any disclaimer, the term of this patent is extended or adjusted under 35 U.S.C. 154(b) by 25 days.

(21) Appl. No.: 14/611,649

(22) Filed: Feb. 2, 2015

(51) Int. Cl.
| | |
|---|---|
| F16D 67/00 | (2006.01) |
| F16D 65/02 | (2006.01) |
| F16D 65/16 | (2006.01) |
| B64C 13/28 | (2006.01) |
| F16D 127/00 | (2012.01) |

(52) U.S. Cl.
CPC ............. F16D 65/028 (2013.01); B64C 13/28 (2013.01); F16D 65/16 (2013.01); F16D 67/00 (2013.01); F16D 2127/005 (2013.01)

(58) Field of Classification Search
CPC ......... F16D 7/005; F16D 7/024; F16D 7/025; F16D 7/027; F16D 43/213; F16D 43/215; F16D 59/00; F16D 67/00; F16D 2125/36; F16D 2125/38; F16D 2127/005; F16D 2127/06; F16H 35/10; F16H 57/10
USPC .......... 192/223.3; 475/900, 263, 264
See application file for complete search history.

(56) References Cited

U.S. PATENT DOCUMENTS

| | | | | |
|---|---|---|---|---|
| 4,030,578 A | * | 6/1977 | Cacciola | F16D 59/00 188/134 |
| 4,898,265 A | * | 2/1990 | Metcalf | F16D 59/00 188/134 |
| 6,231,012 B1 | | 5/2001 | Cacciola et al. | |
| 6,419,606 B1 | * | 7/2002 | Tengan | B64C 13/28 475/254 |
| 6,471,028 B1 | * | 10/2002 | Larson | F16D 7/08 192/137 |
| 6,659,398 B2 | | 12/2003 | Serven | |
| 6,692,399 B2 | | 2/2004 | Larson et al. | |
| 7,367,891 B2 | | 5/2008 | Bae | |
| 2002/0144876 A1 | * | 10/2002 | Harvey | F16D 7/08 192/223.3 |
| 2006/0163026 A1 | * | 7/2006 | Lang | B64C 13/28 192/223 |
| 2008/0185242 A1 | | 8/2008 | Mayer et al. | |

(Continued)

OTHER PUBLICATIONS

"Power Drive Unit (PDU)", Moog Inc., Retrieved from the Internet: http://www.moog.com/products/actuators-servoactuators/actuation-technologies/mechanical/aircraft-mechanical-actuators/power-drive-units/, 2014, 2 pgs.

(Continued)

Primary Examiner — Nicholas J Lane
(74) Attorney, Agent, or Firm — Kwan & Olynick LLP

(57) ABSTRACT

Provided are half system torque brakes, aircraft utilizing these brakes, and methods of installing these brakes. A half system torque brake includes an input cam assembly slidably disposed on a compression shaft between first and second output cam assemblies. The second output cam assembly is disposed between the input cam assembly and a rotor-stator assembly. When a torque differential between the input cam assembly and either one of the output cam assemblies exceeds its threshold, the same rotor-stator assembly is engaged and prevents further rotation of any cam assembly. Specifically, when the torque differential corresponding to the first output cam assembly exceeds its threshold, this assembly advances away from the input cam assembly and pulls the compression shaft in the same direction, which in turn engages the rotor-stator assembly by advancing the pressure plate to the second output cam assembly. The second output cam engages the rotor-stator assembly directly.

20 Claims, 10 Drawing Sheets

(56) References Cited

U.S. PATENT DOCUMENTS

| | | | |
|---|---|---|---|
| 2010/0038493 A1* | 2/2010 | Lang | B64D 45/0005 244/224 |
| 2011/0139566 A1* | 6/2011 | Lang | B64C 13/28 192/56.62 |
| 2013/0313067 A1* | 11/2013 | Finney | F16H 35/10 192/223.2 |
| 2014/0138480 A1 | 5/2014 | Richter | |

OTHER PUBLICATIONS

Borello, L. et al., "Flap Control Systems Actuators: Mathematical and Computational Model for Dynamic Simulation", European Congress on Computational Methods in Applied Sciences and Engineering ECCOMAS, Sep. 2000, 14 pgs.

* cited by examiner

HALF SYSTEM TORQUE BRAKES

TECHNICAL FIELD

This disclosure generally relates to half system torque brakes and, more specifically, to a half system torque brake having a single rotor-stator assembly for controlling two torque differentials of cam couplings.

BACKGROUND

Torque brakes are used in aircraft and other applications to protect various driven mechanisms, such as torque tubes, actuators, gear boxes, and like components, from excessive torques that may result, for example, during stalls in these driving mechanisms and other like conditions. When such conditions occur, the torque brakes can interrupt the torque transfer from driving mechanisms to driven mechanisms. A specific example of torque brakes is a half system torque brake (HSTB), which is used to control the torque transfer from a single driving mechanism to two driven mechanisms at the same time. Specifically, the half system torque brake needs to prevent excessive torque differentials between the driving mechanism and either one of the two driven mechanisms. While the half system torque brake effective can replace two standard torque brakes (e.g., one for each of the two driven mechanisms), many conventional half system torque brakes have very complex mechanisms with many duplicate parts. For example, a conventional half system torque brake used two separate single rotor-stator assemblies, one for each of the two driven mechanisms. Such half system torque brakes are large, heavy, and costly to manufacture and maintain. Furthermore, adjustments of such conventional half system torque brakes often need to be performed after their installation into their supporting structures, such as housings, since these supporting structures are used as fixed stop for many functions, such as controlling compression of the rotor-stator assemblies.

SUMMARY

In some embodiments, a half system torque brake may be used with a first driven mechanism and second driven mechanism. The half system torque brake may include a compression shaft, first output cam assembly, input cam assembly, second output cam assembly, and rotor-stator assembly. The half system torque brake may also include other components as further described below.

The input cam assembly may be slidably disposed on the compression shaft. Specifically, the compression shaft may slide with respect to the input cam assembly along the center axis of the compression shaft when, for example, the rotor-stator assembly is being engaged. More specifically, this sliding occurs when a torque differential between the input cam assembly and the first output cam assembly exceeds its threshold. The input cam assembly may be associated with a driving mechanism, such as an electrical motor, hydraulic motor, or both. When the half system torque brake is installed input cam assembly is coupled to the driving mechanism such that the driving mechanism can rotate the input cam assembly around the center axis of the compression shaft with respect to the driving mechanism or some fixed support unless the rotor-stator assembly is engaged. The compression shaft may or may not rotate together with the input cam assembly.

The first output cam assembly is disposed on the compression shaft and movably coupled to the input cam assembly. This movable coupling allows the torque transfer from the input cam assembly to the first output cam assembly during operation of the half system torque brake unless the rotor-stator assembly is engaged. The first output cam assembly is associated with the first driven mechanism, which may include one or more torque tubes, one or more actuators, and other like devices that are coupled to the first output cam assembly when the half system torque brake is installed.

The second output cam assembly is slidably disposed on the compression shaft. Specifically, the compression shaft may slide with respect to the second output cam assembly along the center axis of the compression shaft when, for example, the rotor-stator assembly is being engaged. This movement may occur either when the torque differential between the input cam assembly and the first output cam assembly exceeds its threshold or when the torque differential between the input cam assembly and the second output cam assembly exceeds its threshold. The second output cam assembly is also movably coupled to the input cam assembly. This movable coupling allows the torque transfer from the input cam assembly to the second output cam assembly during operation of the half system torque brake unless the rotor-stator assembly is engaged. The input cam assembly is disposed between the first output cam assembly and the second output cam assembly on the compression shaft. Furthermore, the second output cam assembly is associated with the second driven mechanism, which may include one or more torque tubes, one or more actuators, and other like devices. These devices are coupled to the second output cam assembly when the half system torque brake is installed.

The rotor-stator assembly is disposed on the compression shaft such that the second output cam assembly is disposed between the input cam assembly and the rotor-stator assembly. The rotor-stator assembly includes a rotor, stator, and pressure plate. The pressure plate may be used for engaging the rotor and stator or, more specifically, for pressing the rotor against the stator. Specifically, the rotor and stator are compressed between the pressure plate and second output cam assembly when the rotor-stator assembly is engaged. When engaged, the rotor cannot rotate with respect to the stator. This engagement may be also used to stop rotation of all cam assemblies as further describe below.

When either the first torque differential between the input cam assembly and the first output cam assembly exceeds its threshold (i.e., a first threshold) or when the second torque differential between the input cam assembly and the second output cam assembly exceeds its threshold (i.e., a second threshold), the rotor and stator are engaged. As noted above, this engagement also prevents rotation of the rotor with respect to the stator. However, this engagement also prevents rotation of the input cam assembly with respect to the stator since the input cam assembly is coupled to the rotor through the second output cam assembly. When the stator is coupled to a fixed support, then the rotation of the input cam assembly is effectively stopped. It should be noted that in this case, the rotation of the first output cam assembly and the second output cam assembly is also stopped. Specifically, the rotor may be fixedly coupled to the second output cam assembly, while the stator is associated with a fixed support for the half system torque brake.

In some embodiments, the first output cam assembly includes a first output cam plate having three or more first output cam channels. Each channel includes a deep channel portion and a shallow channel portion. A ball of a first ball set may be positioned in each channel such that the ball continuously contacts the input cam assembly and the first output cam plate after the half system torque brake is assembled.

The second output cam assembly may include a second output cam plate having three or more second output cam channels. Each channel in this second output cam plate also includes a deep channel portion and a shallow channel portion, which may be similar or the same as the deep and shallow channel portions in the first output cam plate. In some embodiments, the deep and shallow channel portions of channels in the first output cam plate are different from those of in the second output cam plate. A ball of a second ball set is positioned in each channel of the second output cam plate such that the ball continuously contacts the input cam assembly and the second output cam plate.

When each ball in each channel of the first output cam plate remains in its corresponding deep channel portion and when the ball in each channel of the second output cam plate remains in its corresponding deep channel portion, the rotor and stator are disengaged. At this point the distance between the first output cam plate and second output cam plate is at its minimum. Likewise, the distance between the input cam assembly and either one of the first output cam plate and second output cam plate is at its minimum.

However, when either the ball in each channel of the first output cam plate moves into its corresponding shallow channel portion or when the ball in each channel of the second output cam plate moves into its corresponding shallow channel portion, the rotor and the stator are engaged. Moving the ball from the deep channel portion into the shallow channel portion results in the input cam assembly moving away from the corresponding output cam plate (i.e., the first output cam plate or the second output cam plate). Specifically, moving the ball in the channel of the first output cam plate from the deep channel portion into the shallow channel portion corresponds to: (a) moving the first output cam plate away from the input cam assembly, (b) advancing the compression shaft in a direction from the second output cam assembly to the first output cam assembly, and (c) advancing the pressure plate using the compression shaft toward the second output cam assembly thereby engaging the rotor and the stator. On the other hand, moving the ball in the channel of the second output cam plate from the deep channel portion into the shallow channel portion corresponds to: (a) moving the second output cam plate away from the input cam assembly, and (b) advancing the second output cam assembly toward the pressure plate thereby engaging the rotor and the stator. In the latter case, the pressure plate does not advance with respect to the input cam assembly since the pressure plate is supported by the compression shaft.

In some embodiments, the input cam assembly includes a drive gear coupled to a first input cam plate and second input cam plate using a shock absorbing spring pack. The first input cam plate is movably coupled to the first output cam assembly, while the second input cam plate is movably coupled to the second output cam assembly. The shock absorbing spring pack is operable to absorb a shock by allowing the drive gear to continue turning for a limited angle after the rotor engaged the stator.

In some embodiments, the first threshold of the first torque differential is equal to the second threshold of the second torque differential. This type of the half system torque brake may be referred to as a symmetric half system torque brake and may be used to drive to similar driven mechanisms, such as flaps on two different wings of the same aircraft. In this situation, the design of channels in the first output cam plate and second output cam plate may be the same. Furthermore, the corresponding input cam plates and balls may be the same. However, one having ordinary skills in the art would understand that the same torque differentials may be achieved with dissimilar cam plate designs.

In some embodiments, the first threshold of the first torque differential is greater than the second threshold of the second torque differential. This type of the half system torque brake may be referred to as an asymmetric half system torque brake and may be used to drive to two different types of driven mechanisms. In this situation, the design of channels in the first output cam plate may be different from the design of channels in the second output cam plate. Furthermore, the corresponding input cam plates and balls may be different.

In some embodiments, the half system torque brake also includes an adjustment nut threadably coupled to the compression shaft. The position of the adjustment nut on the compression shaft controls the first threshold of the first torque differential and the second threshold of the second torque differential. It should be noted that both thresholds are controlled at the same time by changing the position of the same adjustment nut. The threshold values and rates of changing these values (e.g., during adjustment) may be the same or different depending on the design of the corresponding cam plates as described elsewhere in this disclosure.

In some embodiments, the half system torque brake includes a biasing mechanism disposed between the second output cam assembly and pressure plate. The biasing mechanism forces the second output cam assembly away from the pressure plate. As such, unless the pressure plate and the second output cam assembly are compressed against each other (e.g., when either one of the torque thresholds is exceeded), the second output cam assembly is pushed away from the pressure plate thereby keeping the rotor disengaged from the stator. However, when either of the torque thresholds is exceeded, the force of the biasing mechanism is overcome, and the pressure plate and the second output cam assembly are brought closer together. The biasing mechanism may be a Belleville spring.

In some embodiments, the half system torque brake includes a first thrust bearing disposed between the compression shaft and first output cam assembly. The first thrust bearing rotatably engages the compression shaft and first output cam assembly and allows the first output cam assembly to rotate with respect to the compression shaft. At the same time, when the first output cam assembly is advanced in a direction away from the input cam assembly it also pulls the compression shaft in the same direction and causes the compression shaft to advance by the same distance. Alternatively, the compression shaft may be fixedly coupled to the first output cam assembly such that rotation of one causes the same rotation of the other.

In some embodiments, the half system torque brake includes a second thrust bearing disposed between the pressure plate and an adjustment nut threadably coupled to the compression shaft. The second thrust bearing rotatably engages the pressure plate and the compression shaft through, for example, the adjustment nut and allows the pressure plate to rotate with respect to the compression shaft. More generally, the second thrust bearing allows the rotor-stator assembly to rotate with respect to the compression shaft. At the same time, when the adjustment nut advances in the direction toward the input cam assembly it also pushes the pressure plate in the same resulting in engagement of the rotor-stator assembly. Alternatively, the compression shaft may be fixedly coupled to the rotor-stator assembly such that rotation of one causes the same rotation of the other. It should be noted that the rotor-stator assembly may not rotate around the center axis of the compression shaft with respect to the second output cam plate.

In some embodiments, the half system torque brake also includes a support bearing disposed on an external surface of the input cam assembly. The support bearing may be used for rotatably engaging the half system torque brake to a fixed support. As such, the input cam assembly may rotate with respect to the fixed support around the center axis of the compression shaft. In some embodiments, the half system torque brake also includes an additional support bearing. For example, a separate support bearing may be provided on the different side of the input cam assembly.

In some embodiments, each of the input cam assembly, first output cam assembly, and second output cam assembly is rotatably disposed on the compression shaft. In other words, each of these assemblies can rotate with respect to the compression shaft around its center axis. Alternatively, the input cam assembly or either one of these first output cam assembly or the second output cam assembly may be non-rotatably coupled to the compression shaft such that rotation of the compression shaft causes the same rotation of the corresponding assembly. It should be noted that the input cam assembly still needs to be slidably coupled to the compression shaft even though the input cam assembly may not be able rotate with respect to the compression shaft in some embodiments. Likewise, the second output cam assembly needs to be slidably coupled to the compression shaft even though the second output cam assembly may not be able to rotate with respect to the compression shaft, in some embodiments, e.g., different from the embodiments in which the input cam assembly is not able rotate with respect to the compression shaft. However, the first output cam assembly is not slidably coupled to the compression shaft regardless of whether these two components can rotate with respect to each other. Finally, if the input cam assembly is not rotatable with respect to the compression shaft, then the first output cam assembly and the second output cam assembly are both rotatable with respect to the compression shaft. Likewise, if one the first output cam assembly and the second output cam assembly is not rotatable with respect to the compression shaft, then the other one of these output cam assemblies is rotatable. Furthermore, in this last example, the input cam assembly is also not rotatable with respect to the compression shaft.

In some embodiments, the compression shaft is slidably coupled to the stator of the rotor-stator assembly such that the stator can slide along the center axis of the compression shaft. Furthermore, in some embodiments, the stator may not be rotatable around the center axis of the compression shaft with respect to the compression shaft. In this case, the compression shaft may be attached to a fixed supported. As such, the stator may be non-rotatably coupled to the fixed support by the compression shaft. Alternatively, the stator may be directly coupled to the fixed support. In this later example, the stator may or may not be able to rotate around the center axis of the compression shaft. In either case, the stator can slide along the center axis of the compression shaft in order to engage and disengage with the rotor.

In some embodiments, the stator includes a tooth for slidably coupling with a fixed support. This tooth allows the stator to slide along the center axis of the compression shaft between the first output cam assembly and the pressure plate while being non-rotatably coupled to the fixed support. Furthermore, the stator may not be rotatable around the center axis of the compression shaft with respect to the fixed support.

Also provided is an aircraft including a driving mechanism, first driven mechanism, second driven mechanism, and half system torque brake. The driving mechanism may include an electrical motor, hydraulic motor, or both. The first driven mechanism may include one or more torque tubes and/or or one or more actuators. In some embodiments, the first driven mechanism may include one or more torque brakes. Likewise, the second driven mechanism may include one or more torque tubes, one or more actuators, and/or one or more torque brakes. Various examples of suitable half system torque brakes are described elsewhere in this disclosure.

Also provided is a method of installing a half system torque brake. In some embodiments, the method involves changing the position of an adjustment nut on a compression shaft of the half system torque brake. The half system torque brake includes a first output cam assembly, input cam assembly, second output cam assembly, and rotor-stator assembly disposed on the compression shaft. The input cam assembly is disposed between and movably coupled to the first output cam assembly and second output cam assembly. The rotor-stator assembly is disposed between the second output cam assembly and adjustment nut. Changing the position of the adjustment nut changes distance between the pressure plate of the rotor-stator assembly and the second output cam assembly. The rotor-stator assembly includes a rotor and stator, which are slidably disposed on the compression shaft between the pressure plate and the second output cam assembly.

The method may proceed with determining at least one a first threshold of a first torque differential and a second threshold of a second torque differential. The first threshold is associated with the movable coupling between the input cam assembly and the first output cam assembly, while the second threshold is associated with the movable coupling between the input cam assembly and the second output cam assembly. Changing the position of the adjustment nut changes both of these thresholds. As such, the position of the adjustment nut may be changed at least one additional based on the values of the first threshold and second threshold obtained. More specifically, changing position of the adjustment nut operation and determine thresholds of two torque differentials may be repeated until the values of these thresholds are within a predetermined range. In some embodiments, only one of the two thresholds is determined during the above mentioned operations. The value of the other threshold may be the same or related to the value of the determined threshold.

In some embodiments, after determining at least one the differential torque thresholds, the method proceeds with installing the half system torque brake into its housing. The installing operation may involve slidably engaging the stator to the housing such that the stator is slidable along the center axis of the compression shaft but not rotatable with respect to this axis after this installation operation.

BRIEF DESCRIPTION OF THE DRAWINGS

Figure 1:
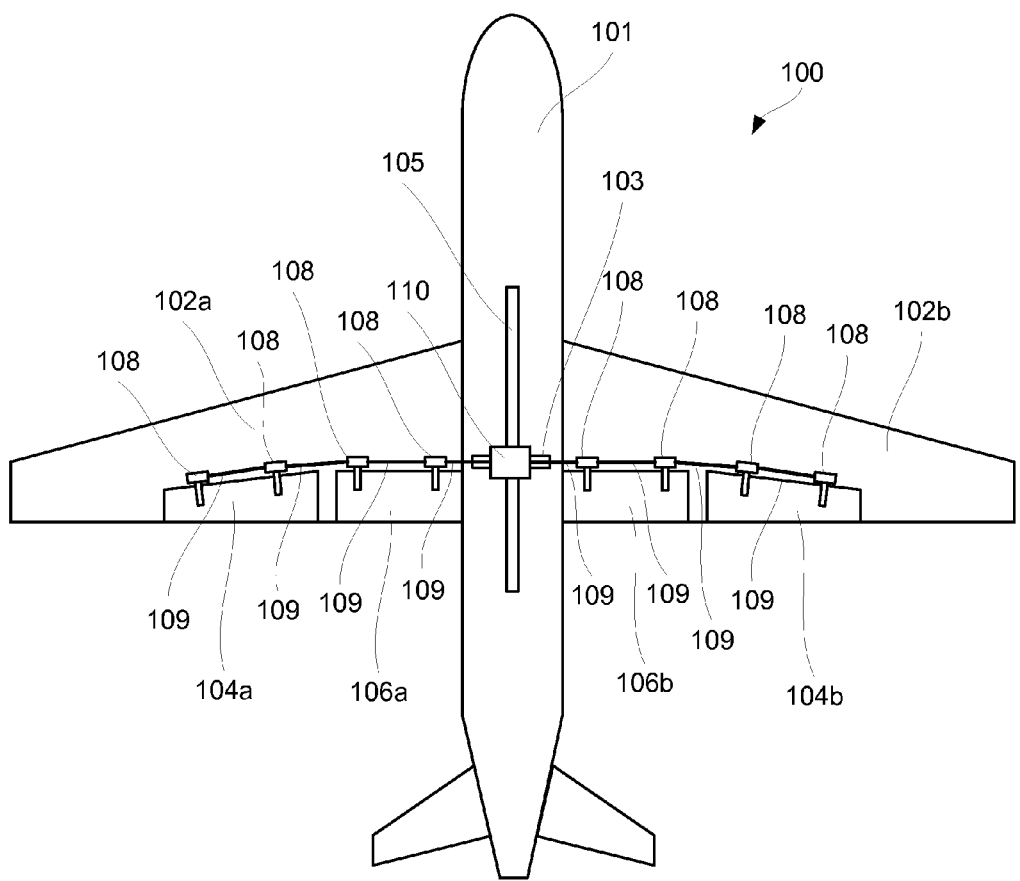

Having thus described examples of the disclosure in general terms, reference will now be made to the accompanying drawings, which are not necessarily drawn to scale, and wherein like reference characters designate the same or similar parts throughout the several views, and wherein:

FIG. 1 is a schematic representation of an aircraft having various driving and driven mechanisms, in accordance with some embodiments.

Figure 2:
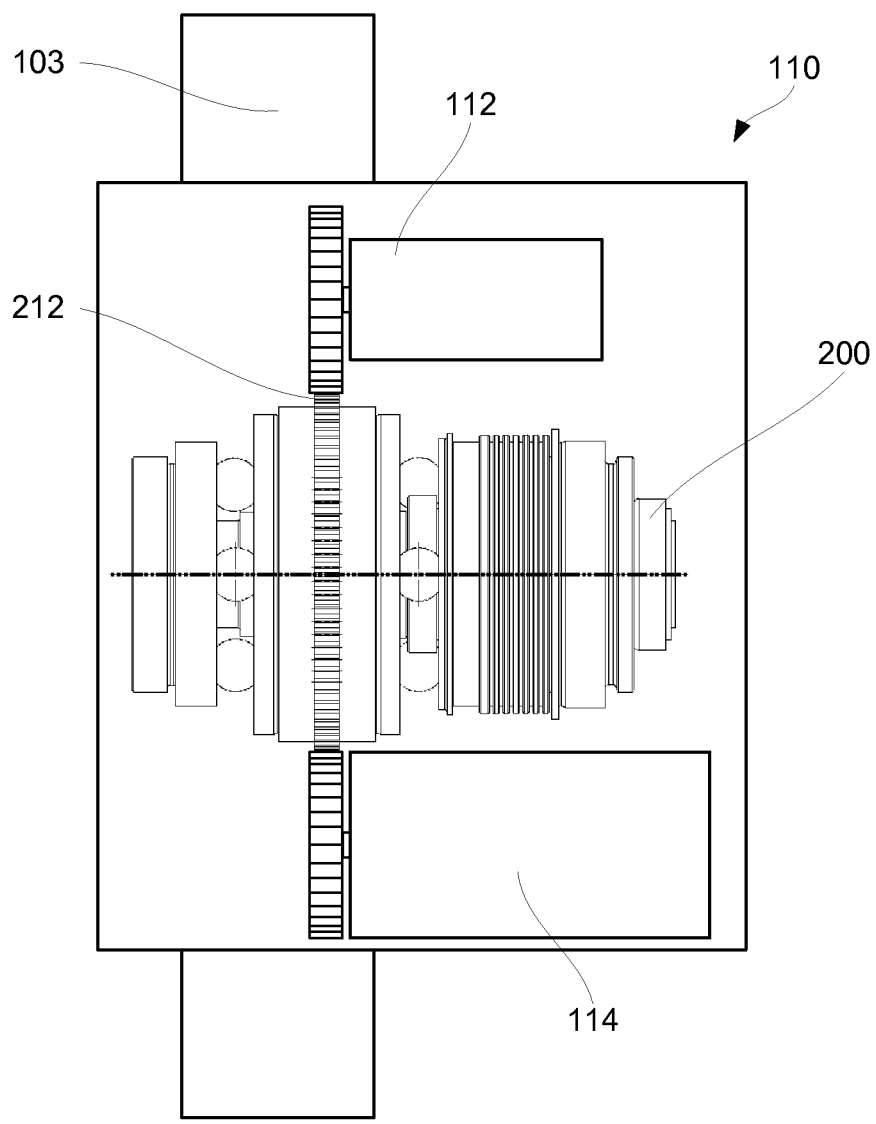

FIG. 2 is a schematic representation of a power drive unit (PDU) having a half system torque brake, in accordance with some embodiments.

Figure 3A:
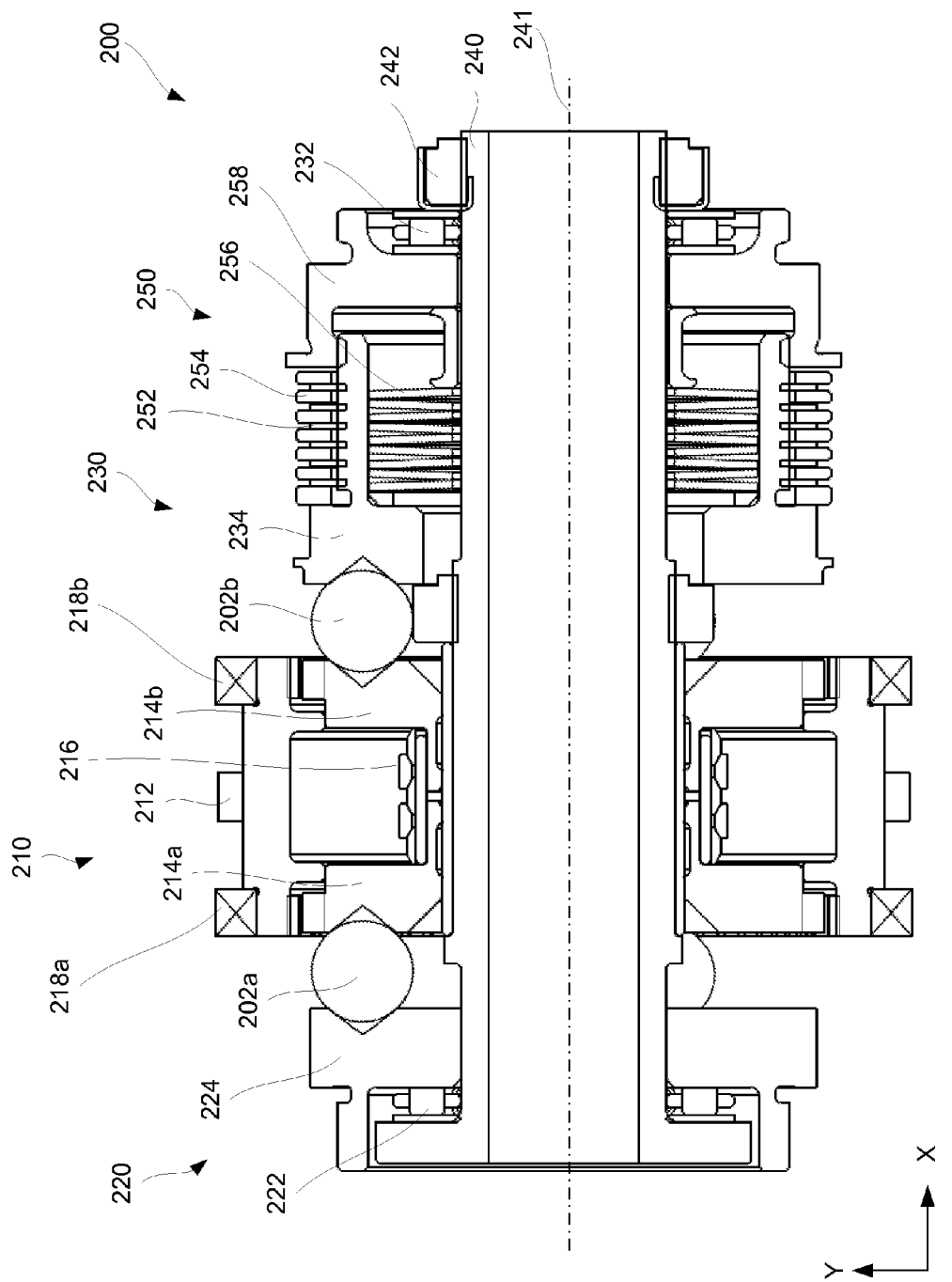

FIG. 3A is a schematic cross-sectional view of a half system torque brake, in accordance with some embodiments.

Figure 3B:
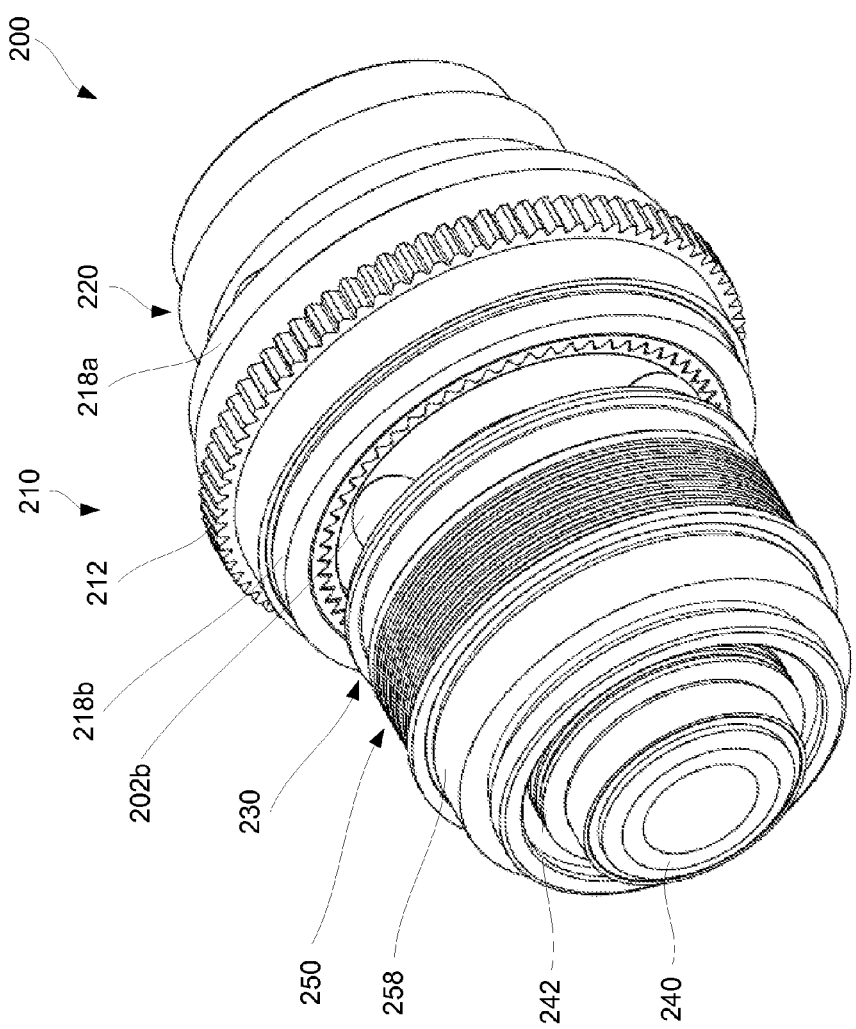

FIG. 3B is a schematic perspective view of the half system torque brake illustrated in FIG. 3A, in accordance with some embodiments.

Figure 3D:
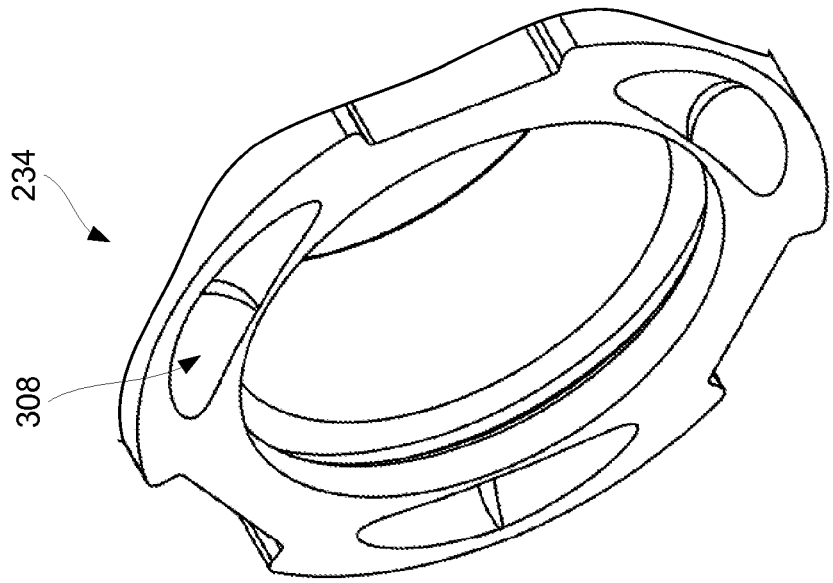
Figure 3C:
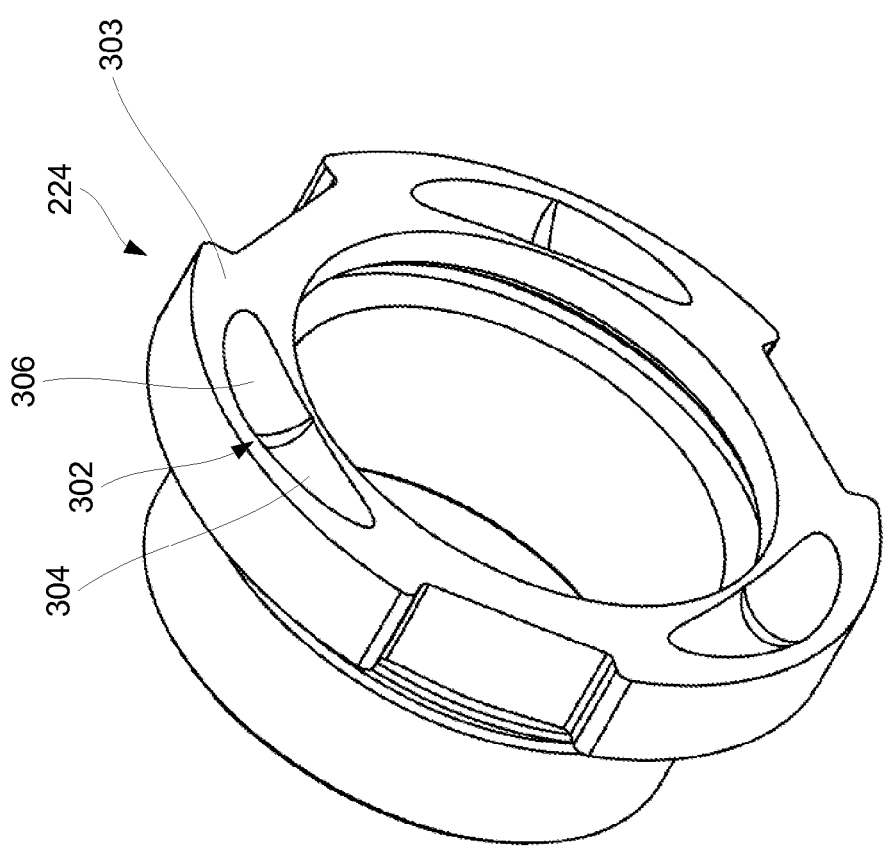

FIGS. 3C and 3D are schematic perspective views of output cam plates of the half system torque brake illustrated in FIG. 3A, in accordance with some embodiments.

Figure 3E:
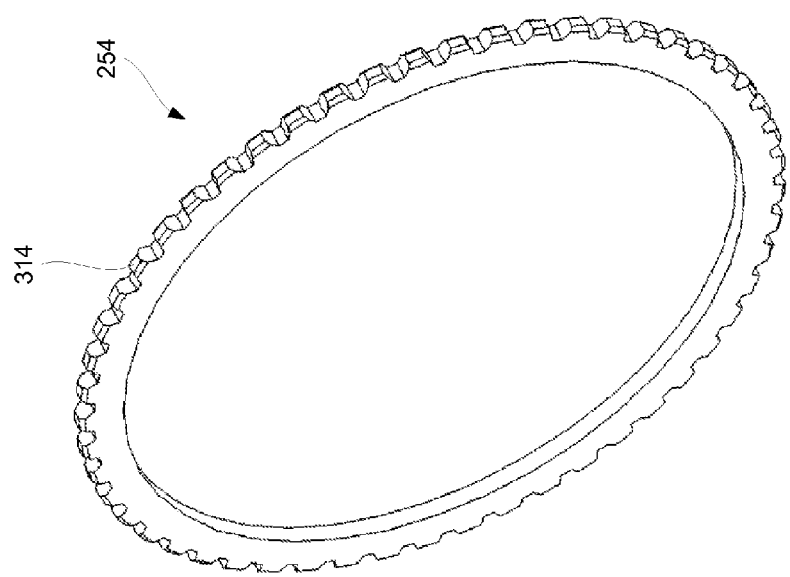

FIG. 3E is a schematic perspective view of a stator of the half system torque brake illustrated in FIG. 3A, in accordance with some embodiments.

Figure 3F:
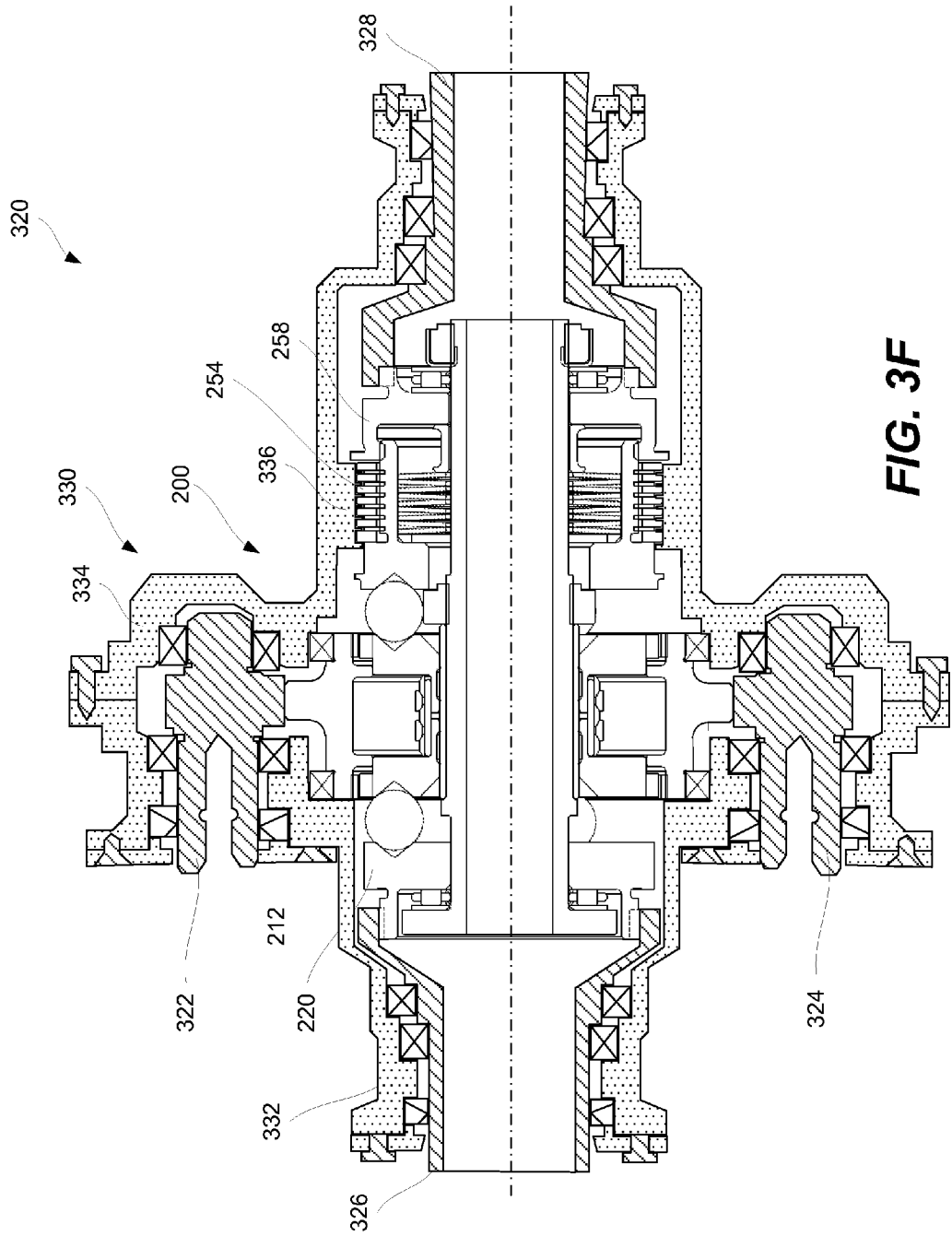

FIG. 3F is a schematic cross-sectional view of a brake assembly illustrating the half system torque brake of FIG. 3A installed into the housing and connected to two output shafts, in accordance with some embodiments.

Figure 4:
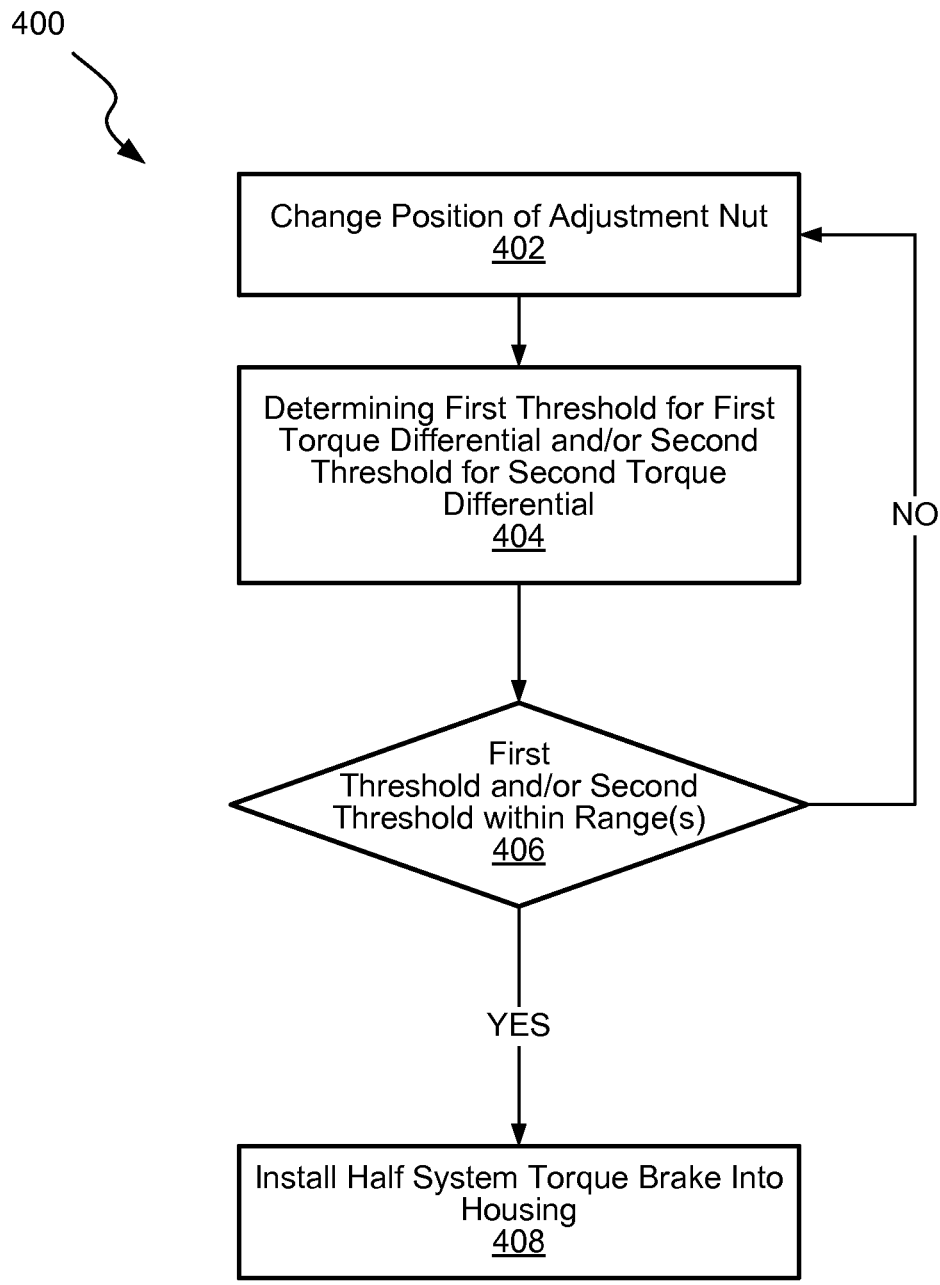

FIG. 4 is a process flowchart corresponding to a method of installing a half system torque brake, in accordance with some embodiments.

Figure 5:
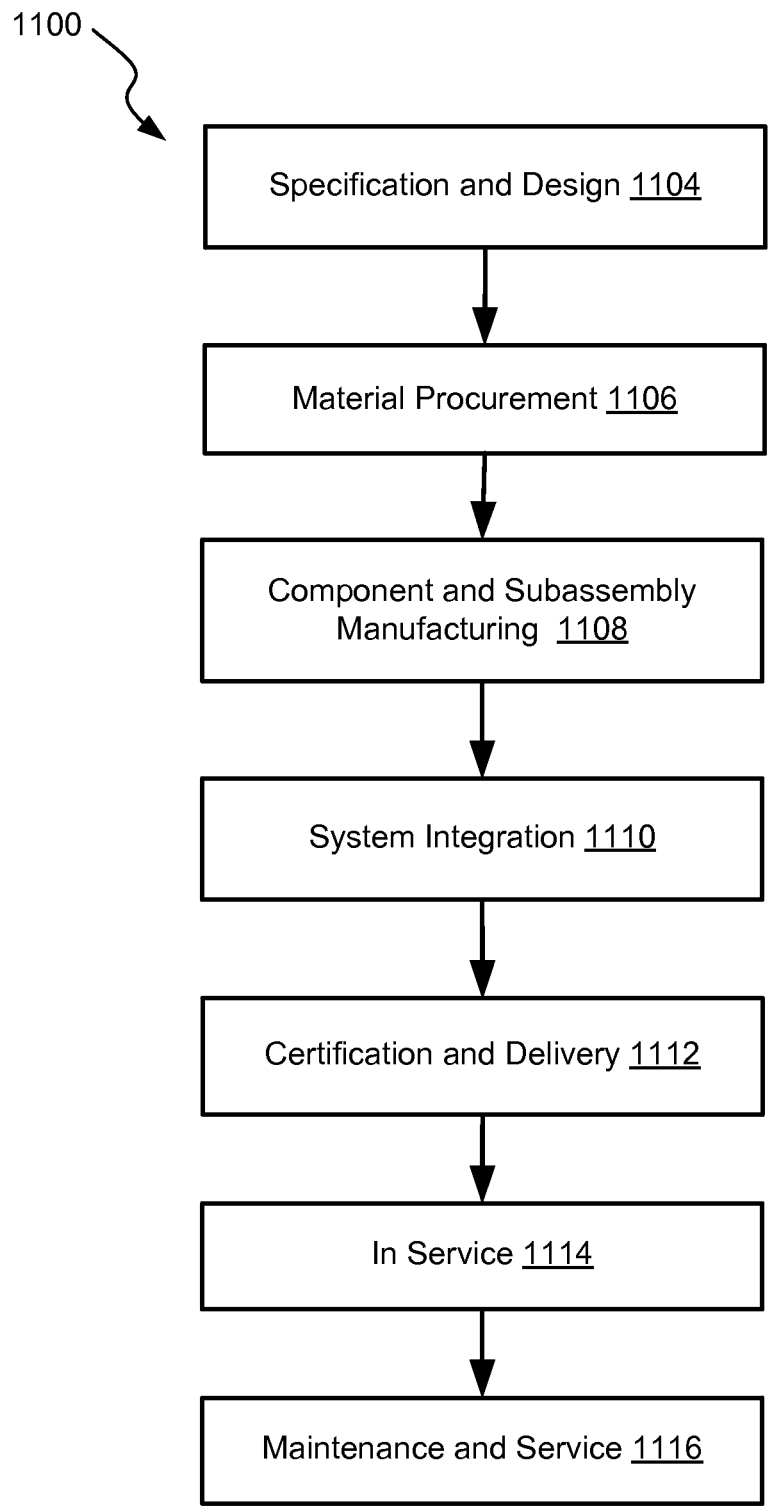

FIG. 5 is a block diagram of an aircraft production and service methodology that may utilize one or more integrated locks, each including a composite structure interlocked with at least one shape memory alloy structure.

Figure 6:
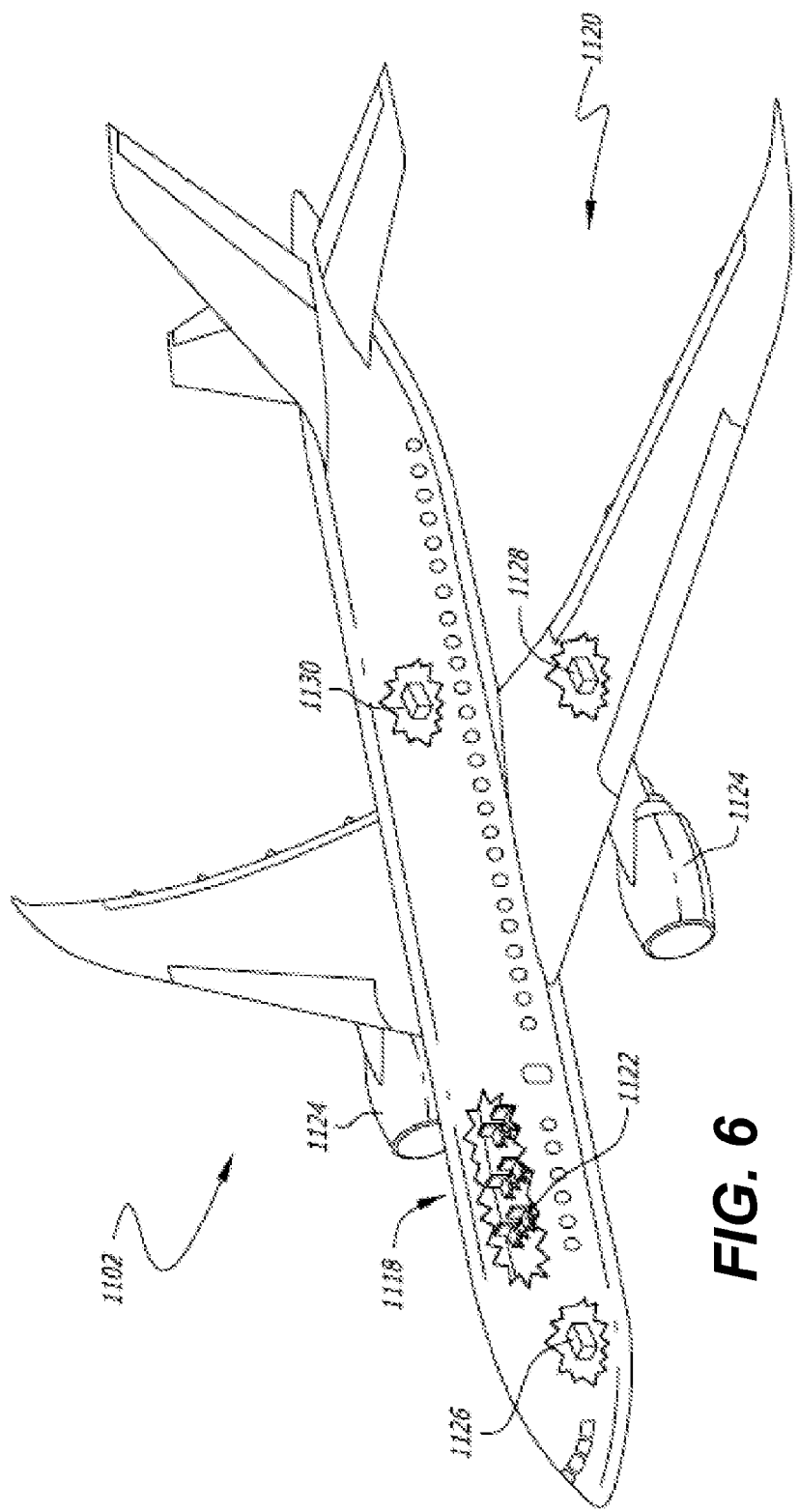

FIG. 6 is a schematic illustration of an aircraft that may utilize one or more integrated locks, each including a composite structure interlocked with at least one shape memory alloy structure.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.
Introduction Torque transmission systems, such as systems for controlling wing surfaces on aircraft, transmit torque from driving mechanisms (e.g., centralize motors) to driven mechanisms (e.g., actuators, flaps, and the like). The torque may be further transmitted using torque tubes, gearboxes, and/or other like components. A transmission system may include one or more devices that prevent over-torque conditions in that system. Some examples of these devices include torque limiters and torque brakes. By preventing the over-torque conditions, components of the system disposed after a torque limiter or a torque brake (in the direction of the torque transmission) can be made with lower torque capabilities. Specifically, these components may be made from less materials (e.g., thinner torque tubes), cheaper materials, and/or lighter materials, which may result in substantial weight and/or cost savings. Furthermore, preventing the over-torque conditions in the torque transmission system helps to ensure its safety and robust operation.

A torque limiter is configured to limit the torque transferred from a driving mechanism to a driven mechanism by allowing its input shaft (coupled to the driving mechanism) to slip relative to its output shaft (coupled to the driven mechanism). The torque limiter may have additional control monitoring to ensure that the over-torque condition does not occur at the output shaft because the torque limiter allows the driving mechanism the input shaft to continue rotating at all times.

Unlike a torque limiter, a torque brake locks out a system and actually stops the driving mechanism, rather than simply limiting the torque transferred. With the torque brake, the torque transfer is stopped. Likewise, rotation of all major components stops when the over-torque condition is experienced. Conventionally, one torque brake controls torque for one driven mechanism using one rotor-stator assembly. Specifically, the rotor-stator assembly is used to stop the rotation of the output and input shafts when reaching or exceeding a certain threshold differential between these shafts.

One type of a torque brake is a half system torque brake. The half system torque brake has two output shafts and is used to control torque provided to two different driven mechanisms, each mechanism attached to a different output shaft of the brake. A typical half system torque brake uses two rotor-stator assemblies, each assembly controlling a torque applied to a different output shaft or, more specifically, controlling a torque differential between the corresponding output shaft and a common input. Either one of these two rotor-stator assemblies may be used to lock the entire brake and stop the torque transfer to both output shafts. Each rotor-stator assembly may be adjusted independently after the half system torque brake is installed into a housing or some other fixed support.

One application for torque brakes and, more specifically, for half system torque brakes is a power drive unit (PDU) of an aircraft. The PDU provides torque from one or more centralized motors to the control surfaces of both wings of the aircraft. For example, a PDU may include an electric motor, hydraulic motor, and/or air driven motor. The PDU may be coupled to torque tubes leading to wings' control surfaces, such as leading edges and/or trailing edges. Sometimes, the leading edges may be controlled by separate actuators (e.g., hydraulic actuators) independent from the PDU, while the trailing edges may be controlled by the PDU.

When there is a stall in this torque transmission system, the torque applied by the PDU motors during the stall (e.g., a stall torque) may be higher than torque thresholds of various components of the system. This torque excess usually results in using light components for torque tubes and actuators to keep the weight down. At the same, sufficiently powerful motors may be used in the PDU to avoid motor overloading during continuous operation of the system. A half system torque brake may be provided in the PDU to limit the torque transmitted from the motors to the downstream drive components (e.g., torque tubes, actuators, and gearboxes). Specifically, the half system torque brake prevents application of more than a corresponding threshold torque to each of the two sets of these components (e.g., components of first and second wings).

Provided are half system torque brakes, aircraft utilizing these brakes, and methods of installing these brakes. A half system torque brake includes an input cam assembly slidably disposed on a compression shaft between first and second output cam assemblies. The second output cam assembly is disposed between the input cam assembly and a rotor-stator assembly. When a torque differential between the input cam assembly and either one of the output cam assemblies exceeds its threshold, the same rotor-stator assembly is engaged and prevents further rotation of any cam assembly. Specifically, when the torque differential corresponding to the first output cam assembly exceeds its threshold, this assembly advances away from the input cam assembly and pulls the compression shaft in the same direction, which in turn engages the rotor-stator assembly by advancing the pressure plate to the second output cam assembly. The second output cam engages the rotor-stator assembly directly.

While the following description refers to utilizing the proposed half system torque brakes for controlling torque differentials in aircraft or, more specifically, to control torque differentials between motors in power drive units and wing components, other applications of half system torque brakes, such as shipping and manufacturing, are also within the scope. For example, large sea vessels may use two propellers that are synchronized. In another example, multiple large scale gang drill press machines may use a single drive mechanism to power each machine.

A brief description of one application of half system torque brakes is now provided to provide some context and better understanding of various features of the described half system torque brakes. FIG. 1 is a schematic representation of aircraft 100 having various driving and driven mechanisms, in accordance with some embodiments. These driving and driven mechanisms may be collectively referred to as a flight control actuation system. Specifically, aircraft 100 includes first wing 102a and second wing 102b. Each wing includes controlled surfaces, which are schematically represented by onboard flap 104a and inboard flap 106a of first wing 102a and by onboard flap 104b and inboard flap 106b of second wing 102b. The orientation of these controlled surfaces is changed using actuators 108 and torque tubes 109, which interconnect actuators 108 and couple these actuators 108 to PDU 110. Specifically, PDU 110 changes positions of the control surfaces relative to other parts of wings 102a and 102b (e.g., stationary parts) in order to alter the lift-producing characteristics of wings 102a and 102b. One having ordinary skills in the art would understand that other configurations and components of wing controlled surfaces are within the scope of this disclosure. For example, slat panels can also be operated by the same or similar flight control actuation system. PDU 110 may be positioned in fuselage 101 of aircraft 100 and may be attached to fixed support 103, such as floor beams. Fixed support 103 may be attached to or positioned next to keel beam 105. In some embodiments, PDU 110 is offset from the center of aircraft 100 for spatial integration. In this case, various structure elements may be used in one or both wings 102a and 102b, such as a leading edge spar or a strakelet. PDU 110 includes components that drive torque tubes 109 in order to operate actuators 108.

The symmetrical operation of flaps 104a and 106a and flaps 104b and 106b may be used for safe operation of aircraft 100. At the same time, having multiple driven components in each of wings 102a and 102b may sometimes cause a stall in one of wings 102a and 102b, while components in the other wing may be still movable. To avoid any asymmetry between the position of the control surfaces in two wings 102a and 102b, the movement of flap 104a and 106a is synchronized with the movement of flaps 104b and 106b. This synchronization is maintained even when one set of these flaps suddenly stop moving (e.g., during a stall). A PDU equipped with a half system torque brake may be used for this synchronization as well as preventing excessive torques applied to torque tubes 109 and actuators 108.

FIG. 2 is a schematic representation of PDU 110 having half system torque brake 200, in accordance with some embodiments. For illustration, half system torque brake 200 is shown without its housing. However, one having ordinary skills in the art would understand that a separate housing may be used to enclose some components of half system torque brake 200 and, in some embodiments, to provide a fixed support to these components as shown in FIG. 3F and further described below.

FIG. 2 illustrates first driving mechanism 112 and second driving mechanism 114 both coupled to the same drive gear 212 of half system torque brake 200. For example, first driving mechanism 112 may be an electric motor, while second driving mechanism 114 may be a hydraulic motor. For reference, FIG. 2 also illustrates fixed support 103 to which PDU 110 may be attached.

The described half system torque brake may be used to move control surfaces in right and left wings of an aircraft and to prevent excessive torques in each wing. The half system torque brake uses a single rotor-stator assembly to accomplish this function. The rotor-stator assembly may be also referred to as a single brake plate stack. It limits the torque to each wing or more specifically to drive assemblies in each wing. Furthermore, the same rotor-stator assembly is engaged when a torque differential between the driving mechanism and either one of the two wing drive assemblies exceeds its corresponding threshold. In this case, the rotor of the rotor-stator assembly is pressed against the stator with enough force to stop the rotor's rotation with respect to the stator. The motions of both output shafts and corresponding wing drive assemblies are stopped simultaneously. The rotation of the driving mechanism is stopped as well.

Furthermore, the described half system torque brake can be tested (e.g., adjusted, calibrated, etc.) prior to its installation into a housing. The testing may be performed to ensure that the test value of each or at least one torque differential threshold is within its desirable range. Specifically, a biasing mechanism of the rotor-stator assembly is contained within the half system torque brake and fully supported by brake's other components. In other words, the biasing mechanism does not use any additional external component to function. As such, the initial compression of this biasing mechanism, which determines both torque differential thresholds, may be adjusted prior to the installation of the half system torque brake into the housing, assembling a PDU, or performing any other installation operations (e.g., attaching the brake to a fixed structure). Conventional half system torque brakes generally need to be assembled into their PDUs for testing and cannot be bench tested. Accordingly, it is relatively difficult for a technician to adjust the initial compression of biasing mechanisms (e.g., shimming the spring pack) of multiple rotor-stator assemblies after such assembly.

Because only one rotor-stator assembly is used in a proposed half system torque brake, only one adjustment is needed to control both torque differential thresholds. The relationship between the torque differential thresholds is set by the design of the half system torque brake or, more specifically, by the design of its cams, i.e., the input cam assembly, first output cam assembly, and second output cam assembly. The half system torque brake may have a configuration in which both torque differential thresholds are the same or, more specifically, are always the same regardless of the adjustment. Alternatively, the half system torque brake may have a configuration in which the two torque differential thresholds are different but, for example, maintain a contact ratio of their values regardless of the adjustment. Other configurations are possible as well. Various systems, such as control surfaces of aircraft wings, may greatly benefit from half system torque brakes using single adjustment. There is no risk of mismatching two torque differential thresholds because the relationship is controlled by the design rather than by any later adjustments. This feature may be particularly relevant to systems requiring symmetric operations of two driven mechanisms. On the contrary, a conventional half system torque brake uses two rotor-stator assemblies, and each needs to be adjusted separately. This separate adjustment may cause various issues when one adjustment does not correspond to the other.

The described half torque brake includes a compression shaft and two output cam assemblies disposed on the shaft on each side of an input cam assembly. The input cam assembly includes a drive gear having splines, which are configured to mate with one or more gears of a driving mechanism. The driving mechanism is used to drive the half system torque brake and any driven mechanisms coupled to the output cam assemblies. A first output cam assembly is disposed at a first end of the compression shaft. This output cam assembly is associated with a first driven mechanism and configured to be coupled to that first driven mechanism (e.g., a drive system for a first wing). A second output cam is disposed on the shaft between the input cam assembly and rotor-stator assembly. This output cam assembly is associated with a second driven mechanism and configured to be coupled to that second driven mechanism (e.g., a drive system for a second wing). The rotor-stator assembly is disposed on a second end of the compression shaft such that the second output cam assembly is disposed between the rotor-stator assembly and the input cam assembly. As such, when the first output cam assembly is advanced away from the input cam assembly, the compression shaft advances in the same direction relative to the input cam assembly and second output cam assembly. As a part of this movement, the compression shaft compresses the rotor-stator assembly causing it to engage and stop rotation of all cam assemblies around the center axis of the compression shaft with respect to some fixed support of the half system torque brake.

A cam assembly may include a cam plate with one or more annular channels (e.g., three or more channels) defined in its surface facing another cam plate. For example, a cam plate of the first output cam assembly may have an annular channel in its surface facing a first cam plate of the input cam assembly. In some embodiments, a cam plate of the input cam assembly facing the first output cam assembly may also have a corresponding channel or at least a recess. A cam plate of the second output cam assembly may have an annular channel in its surface facing the input cam assembly. Likewise, a cam plate of the input cam assembly facing the second output cam assembly may also have a corresponding channel or at least a recess. In some embodiments, each cam plate of the output cam assemblies may have three or more channels to ensure load distribution with respect to the center of the plates, which may coincide with the center axis of the compression shaft. When the half system torque brake is assembled, each channel includes a ball to allow an output cam plate to rotate with respect to a corresponding input cam plate. The channel may be designed in such a way that the rotation only occurs when a torque differential between the two cam plates exceeds its threshold. Furthermore, when the output cam plate rotates with respect to the corresponding input cam plate, the gap between the plates (e.g., the gap between the centers of these plates) changes, which in turn engages the rotor-stator assembly as further described below. For example, the channel may have a shallow portion and deep portion. Prior to the engagement of the rotor-stator assembly, the ball may be in the deep portion of the channel. As the output cam plate rotates with respect to the corresponding input cam plate, the ball moves from the deep portion into the shallow portion and causes the gap between the plates to increase.

The rotor-stator assembly may be coupled directly to the second output cam assembly. Specifically, the rotor and stator of the rotor-stator assembly may be disposed between the second output cam assembly and a pressure plate of the rotor-stator assembly. Depending on the distance between the second output cam assembly and pressure plate, the rotor-stator assembly is either engaged (e.g., the distance is less) or not engaged (e.g., the distance is more). The rotor may be coupled about a flange extending from the second output cam assembly. The stator is positioned about the rotor and may be coupled to a fixed housing using, for example, a tooth of the spline. A biasing mechanism (e.g., a spring pack) may be coupled to the rotor and is configured to force the rotor away from the stator unless this force is overcome by the force applied to the rotor-stator assembly.

Specifically, when either the first output cam assembly moves away from the input cam assembly or when the second output cam assembly moves away from the input cam assembly, the rotor-stator assembly is compressed. The second output cam assembly may press directly on the rotor-stator assembly (when the torque differential between this output assembly and input assembly exceeds its threshold) while the other end of the rotor-stator assembly is supported by the compression shaft. In this case, the compression shaft does not slide with respect to the input cam assembly along its axis. On the other hand, when the torque differential between the first output assembly and input cam assembly exceeds its threshold, the first output assembly is pushed away from the input cam assembly causing the compression shaft to advance in the same direction with respect to the input cam assembly and second output cam assembly. It also causes the pressure plate to advance toward the second output cam assembly, which compresses the rotor-stator assembly. Various components of the half system torque brake will now be described in more details with reference to FIGS. 3A-3D.

Examples of Half System Torque Brakes and Components

FIG. 3A is a schematic cross-sectional view of half system torque brake 200, in accordance with some embodiments. As noted above, half system torque brake 200 may be used with two driven mechanisms as described above with reference to FIG. 1. In one example, the first driven mechanism is a controlled wing surface of a first wing of an aircraft, while the second driven mechanism is a controlled wing surface of a second wing of the same aircraft. However, one having ordinary skills in the art would understand that other applications of half system torque brake 200 are also within the scope of this disclosure.

Half system torque brake 200 may include compression shaft 240, first output cam assembly 220, input cam assembly 210, second output cam assembly 230, and rotor-stator assembly 250. Specifically, first output cam assembly 220, input cam assembly 210, second output cam assembly 230, and rotor-stator assembly 250 may be disposed on compression shaft 240, such that first output cam assembly 220 and rotor-stator assembly 250 are positioned and supported at different ends of compression shaft 240. Input cam assembly 210 and second output cam assembly 230 are disposed between first output cam assembly 220 and rotor-stator assembly 250. Furthermore, input cam assembly 210 is disposed between first output cam assembly 220 and second output cam assembly 230. For clarity, second output cam assembly 230 is disposed between input cam assembly 210 and rotor-stator assembly 250.

First output cam assembly 220 and rotor-stator assembly 250 are supported by the two respective ends of compression shaft 240. Neither first output cam assembly 220 nor rotor-stator assembly 250 can slide with respect to compression shaft 240 along its center axis 241 during operation of half system torque brake 200. It should be noted that during adjustment of rotor-stator assembly 250, rotor-stator assembly 250 may slide with respect to compression shaft 240 along its center axis 241.

First output cam assembly 220 does not slide with respect to compression shaft 240 along its center axis 241. A portion of rotor-stator assembly 250 contacting compression shaft 240 (i.e., pressure plate 258) only slides during adjustment.

However, other portions of rotor-stator assembly 250 (i.e., rotor 252 and stator 254) disposed between pressure plate 258 and second output cam assembly 230 slide when rotor-stator assembly 250 is being engaged or disengaged. Furthermore, input cam assembly 210 and second output cam assembly 230 are slidably disposed on compression shaft 240 and can slide with respect to compression shaft 240 along its center axis 241 when engaging or disengaging rotor-stator assembly 250 as further described below.

Input cam assembly 210 is able to rotate with respect to both first output cam assembly 220 and second output cam assembly 230 around center axis 241 of compression shaft 240. As such, if input cam assembly 210 is non-rotatably (but slidably) coupled to compression shaft 240, both first output cam assembly 220 and second output cam assembly 230 are rotatable with respect to compression shaft 240. The independent rotation features of the input and output cam assemblies also indicates that if one of first output cam assembly 220 or second output cam assembly 230 is non-rotatably coupled to compression shaft 240, the other output cam and input cam assembly 210 are both rotatable with respect to compression shaft 240. Furthermore, regardless of rotatable coupling options, first output cam assembly 220 is non-slidably coupled to compression shaft 240, while second output cam assembly 230 and input cam assembly 210 are slidable with respect to compression shaft 240 as described above. As such, the rotatable and slidable features are independent from each other.

Overall, input cam assembly 210 may be slidably disposed on compression shaft 240. Specifically, compression shaft 240 may slide with respect to input cam assembly 210 along center axis 241 of compression shaft 240 when, for example, rotor-stator assembly 250 is being engaged or, more specifically, when a torque differential between input cam assembly 210 and first output cam assembly 220 exceeds its threshold. Compression shaft 240 may or may not rotate together with input cam assembly 210. For example, when compression shaft 240 rotates together with input cam assembly 210, the slidable spline coupling may be provided between the two. Compression shaft 240 may be supported by the internal surface of input cam assembly 210 (i.e., its internal diameter). In some embodiments, compression shaft 240 may be also constrained from moving axially by thrust bearings 222 and 232.

Input cam assembly 210 may be associated with a driving mechanism, such as an electrical motor, hydraulic motor, or both. During operation of half system torque brake 200, the driving mechanism rotates input cam assembly 210 around center axis 241 of compression shaft 240 with respect to a fixed support unless rotor-stator assembly 250 is engaged. When rotor-stator assembly 250 is engaged, input cam assembly 210 does not rotate with respect to the fixed support. Input cam assembly 210 may have drive gear 212 as shown in FIGS. 3A and 3B with splines for engaging with corresponding one or more gears of the driving mechanism.

In some embodiments, drive gear 212 of input cam assembly 210 may be coupled to first input cam plate 214a and second input cam plate 214b using shock absorbing spring pack 216. First input cam plate 214a may be movably coupled to first output cam assembly 220, while second input cam plate 214b may be movably coupled to second output cam assembly 230. Shock absorbing spring pack 216 is operable to absorb a shock when rotor-stator assembly 250 is engaged. Specifically, shock absorbing spring pack 216 allows drive gear 212 to continue turning for a limited angle with respect to first input cam plate 214a and second input cam plate 214b. The angle depends on the design of shock absorbing spring pack 216 and first and second torque differential thresholds. Some shock absorbing characteristics may be also provided by rotor-stator assembly 250, such as rotation of rotor 252 gradually slowing with respect stator 254 as rotor-stator assembly 250 is being compressed and engaged.

First output cam assembly 220 is disposed on compression shaft 240 and movably coupled to input cam assembly 210. This movable coupling allows torque transfer from input cam assembly 210 to first output cam assembly 220 during operation of half system torque brake 200 unless rotor-stator assembly 250 is engaged. When rotor-stator assembly 250 is engaged, input cam assembly 210 and first output cam assembly 220 do not rotate around center axis 241 of compression shaft 240 with respect to the fixed support and no torque is transferred from input cam assembly 210 to first output cam assembly 220. First output cam assembly 220 is associated with a first driven mechanism, which may include one or more torque tubes, one or more actuators, and or like devices coupled to first output cam assembly 220 when half system torque brake 200 is installed.

The movable coupling between input cam assembly 210 and first output cam assembly 220 allows these two components to rotate in the same direction and at the same rotational speed around center axis 241 of compression shaft 240 when the torque differential between these components is less than its threshold. When the torque differential reaches or exceeds this threshold, input cam assembly 210 initially slips with respect to first output cam assembly 220 in the direction of rotation. This slip causes first output cam assembly 220 to move away from input cam assembly 210 and ultimately engages rotor-stator assembly 250 as further described below. When rotor-stator assembly 250 is engaged, rotation of both input cam assembly 210 and first output cam assembly 220 is stopped in part through the movable coupling between these two components.

Second output cam assembly 230 is slidably disposed on compression shaft 240. Specifically, compression shaft 240 may slide with respect to second output cam assembly 230 along center axis 241 of compression shaft 240 when, for example, rotor-stator assembly 250 is being engaged. This movement may occur when a torque differential between input cam assembly 210 and first output cam assembly 220 exceeds its threshold or when a torque differential between input cam assembly 210 and second output cam assembly 230 exceeds its threshold.

Second output cam assembly 230 is also movably coupled to input cam assembly 210. This movable coupling allows torque transfer from input cam assembly 210 to second output cam assembly 230 during operation of half system torque brake 200 unless rotor-stator assembly 250 is engaged. This movable coupling may be similar to the movable coupling between input cam assembly 210 and first output cam assembly 220 described above. Specifically, the movable coupling between input cam assembly 210 and second output cam assembly 230 allows these two components to rotate in the same direction and at the same rotational speed around center axis 241 of compression shaft 240 when the torque differential between these components is less than its threshold. When the torque differential reaches or exceeds this threshold, input cam assembly 210 initially slips with respect to second output cam assembly 230 in the direction of its rotation. This slip causes second output cam assembly 230 to move away from input cam assembly 210 along center axis 241 of compression shaft 240 and ultimately engages rotor-stator assembly 250 as further described below. When rotor-stator assembly 250 is engaged, rotation of both input cam assembly 210 and second output cam assembly 230 is stopped in part through the movable coupling between these two components.

Examples of various components providing these movable couplings will now be described in more details. In some embodiments, first output cam assembly 220 includes first output cam plate 224 having three or more first output cam channels 302 as, for example, shown in FIG. 3C. One having ordinary skills in the art would understand that any greater number of channels may be used, such as four channels, five channels, and so on. In general, multiple channels may be used for even force distribution and force balancing with respect to the center. Specifically, channels 302 may be evenly disturbed on surface 303 of first output cam plate 224 with respect to the center of first output cam plate 224 (which may coincide with center axis 241 of compression shaft 240 when half system torque brake 200 is assembled) and with respect to each other in order to ensure the even force distribution with respect to the center. Surface 303 and channels 302 face first input cam assembly 210 (as, for example, shown in FIG. 3A), and each of channels 302 contains a ball contacting input cam assembly 210 when half system torque brake 200 is assembled. The balls in all first output cam channels 302 may be collectively referred to as first ball set 202a. Each of channels 302 may include deep channel portion 304 and shallow channel portion 306.

Similar to first output cam assembly 220, second output cam assembly 230 may include second output cam plate 234 having three or more second output cam channels 308 as, for example, shown in FIG. 3D illustrating the face portion of second output cam plate 234. Each channel 308 in this second output cam plate 234 may also include a deep channel portion and shallow channel portion. In some embodiments, the deep and shallow channel portions of the channels in second output cam plate 234 may be similar or the same as the deep and shallow channel portions 304, 306 of the channels 302 in first output cam plate 224. Alternatively, the deep and shallow channel portions of channels 302 in first output cam plate 224 may be different from those of in second output cam plate 234. Overall, the design of these channels 308 may determine corresponding torque threshold differentials. A ball of second ball set 202b is positioned in each channel 308 of second output cam plate 234 such that the ball continuously contacts input cam assembly 210 and second output cam plate 234.

The engagement of the rotor-stator assembly will now be explained with respect to positions of the balls in first and second ball sets 202a and 202b within the channels 302, 308 of first output cam plate 224 and second output cam plate 234. When all balls of first ball set 202a remain in their respective deep channel portions and when all balls of second ball set 202b remain in their respective deep channel portions, rotor 252 and stator 254 are disengaged. At this point, neither first output cam assembly 220 nor second output cam assembly 230 is moved away from input cam assembly 210 and the distance between first output cam assembly 220 and second output cam assembly 230 is at its minimum. More specifically, the distance between first output cam plate 224 and input cam assembly 210 is at its minimum, and also the distance between second output cam plate 234 and input cam assembly 210 is at its minimum. At this state, rotor-stator assembly 250 is not compressed and rotor 252 and stator 254 are not engaged.

Rotor 252 engages stator 254 when one of cam plates 224 and 234 advances away from input cam assembly 210. Specifically, when the first torque differential between input cam assembly 210 and first output cam assembly 220 exceeds its threshold, input cam assembly 210 slips relative to first output cam assembly 220 (in the rotation direction of input cam assembly 210) causing the balls in first ball set 202a to move from their respective deep channel portions to their shallow channel portions. This in turn causes cam plate 224 to advance away from input cam assembly 210 and pull compression shaft 240 in the same direction. Compression shaft 240 in turn advances pressure plate 258 of rotor-stator assembly 250 toward second output cam assembly 230 effective compressing rotor-stator assembly 250 and engaging rotor 252 and stator 254. In this case, cam plate 234 may not move with respect to input cam assembly 210.

Alternatively, when the second torque differential between input cam assembly 210 and second output cam assembly 230 exceeds its threshold, input cam assembly 210 slips relative to second output cam assembly 230 (in the rotation direction of input cam assembly 210) causing the balls in second ball set 202b to move from their respective deep channel portions to their shallow channel portions. This, in turn, causes cam plate 234 to advance away from input cam assembly 210 and compress rotor-stator assembly 250 effectively engaging rotor 252 and stator 254.

Overall, moving the ball of either first ball set 202a or second ball set 202b from their deep channel portions to their shallow channel portions, engages rotor 252 and stator 254. While FIG. 3C and corresponding description refers to output cam plates 224 and 234 having channels with deep channel portions and shallow channel portions, one having ordinary skills in the art would understand that this channel design may be also used for input cam plates 214a and 214d in addition or instead of the channels output cam plates 224 and 234.

The design of channels and/or balls determines threshold values of the first and second torque differentials. In some embodiments, the threshold of first torque differential is equal to the threshold of the second torque differential. This type of half system torque brake 200 may be referred to as a symmetric half system torque brake and may be used to drive to similar driven mechanisms, such as flaps on two different wings of same aircraft. In this situation, the channel design of first output cam plate 224 may be same as that of second output cam plate 234. Furthermore, the corresponding input cam plates and balls may be same. However, one having ordinary skills in art would understand that the same torque differentials may be achieved with dissimilar designs of cam plates and/or balls.

In some embodiments, the threshold of the first torque differential is different (e.g., greater) than the threshold of the second torque differential. This type of half system torque brake 200 may be referred to as an asymmetric half system torque brake and may be used to drive to two different types of driven mechanisms. In this situation, design of channels in first output cam plate 224 may be different from design of channels in second output cam plate 234. Furthermore, corresponding input cam plates and balls may be different. For example, first output cam plate 224 may have a different number of channels than second output cam plate 234.

It should be noted that input cam assembly 210 is movably coupled to first output cam assembly 220 and second output cam assembly 230 at the same time. As such, when rotor-stator assembly 250 is not engaged, the rotation of input cam assembly 210 transfers torque to both first output cam assembly 220 and second output cam assembly 230. Furthermore, rotor-stator assembly 250 may be engaged when a torque differential between input cam assembly 210 and either first output cam assembly 220 or second output cam assembly 230 exceeds its predetermined threshold, in which case all three cam assemblies (i.e., input cam assembly 210, first output cam assembly 220, and second output cam assembly 230) are stopped.

First output cam assembly 220 is associated with a first driven mechanism, which may include one or more torque tubes, one or more actuators, and or like devices. These devices may be coupled to first output cam assembly 220 after installation of half system torque brake 200. Second output cam assembly 230 is associated with a second driven mechanism, which may include one or more torque tubes, one or more actuators, and or like devices. These devices may be coupled to second output cam assembly 230 after installation of half system torque brake 200. In some embodiments, the second driven mechanism associated with second output cam assembly 230 is substantially the same as the first driven mechanism associated with first output cam assembly 230.

Rotor-stator assembly 250 may be disposed on compression shaft 240 or, more specifically, on second output cam assembly 230. Rotor-stator assembly 250 includes rotor 252, stator 254, and pressure plate 258. Pressure plate 258 may be used for engaging rotor 252 and stator 254 by pressing rotor 252 against stator 254. Specifically, rotor 252 and stator 254 are compressed between pressure plate 258 and second output cam assembly 230 when rotor-stator assembly 250 is engaged. When engaged, rotor 252 cannot rotate with respect to stator 254. Furthermore, after installation of half system torque brake 200, stator 254 may be slidably and non-rotatably coupled to a fixed support. As such, stator 254 may slide with respect to the fixed support along center axis 241 of compression shaft, but stator 254 may not be able to rotate with respect the fixed support around center axis 241. The sliding feature allows moving stator 254 with respect to rotor 252 along center axis 241 in order to engage or disengage these two components. The non-rotatable feature allows preventing the rotation of stator 254 and, when engaged, also the rotation of rotor 252 as well the rotation of the second output cam assembly 230, which may be non-rotatably coupled to rotor 252.

To provide this non-rotatable but slidable coupling to the fixed support, stator 254 includes tooth 314 as, for example, shown in FIG. 3E. Tooth 314 may protrude into a corresponding recess of the fixed support (e.g., a housing) during installation of half system torque brake 200. As such, stator 254 can slide along center axis 241 of compression shaft 240 between first output cam assembly 220 and pressure plate 258. Furthermore, stator 254 may not be rotatable around center axis 241 of compression shaft 240 with respect to fixed support.

In some embodiments, compression shaft 240 is slidably coupled to stator 254 of rotor-stator assembly 250 such that stator 254 is slidable along center axis 241 of compression shaft 240 between first output cam assembly 220 and pressure plate 258. However, stator 245 may not be rotatable around center axis 241 of compression shaft 240 with respect to compression shaft 240. In this case, compression shaft 240 may be attached to a fixed support or, more specifically, stator 254 may be non-rotatably coupled to fixed support by compression shaft 240. Alternatively, stator 254 may be directly coupled to the fixed support.

In some embodiments, half system torque brake 200 or, more specifically, rotor-stator assembly 250 includes biasing mechanism 256 disposed between second output cam assembly 230 and pressure plate 258 and forcing second output cam assembly 230 away from pressure plate 258. As such, unless pressure plate 258 and second output cam assembly 230 are compressed against each other with a force exceeding the force of biasing mechanism 256, second output cam assembly 230 is pushed away from pressure plate 258 thereby keeping rotor 252 disengaged from stator 254. The force of biasing mechanism 256 is overcome and pressure plate 258 and second output cam assembly 230 are brought closer together when either one of torque thresholds is exceeded. As noted elsewhere in this disclosure, this causes engagement of rotor 252 and stator 254. Biasing mechanism 256 may be a Belleville spring.

When the first torque differential between input cam assembly 210 and first output cam assembly 220 exceeds its threshold or when the second torque differential between input cam assembly 210 and second output cam assembly 230 exceeds its threshold, rotor 252 and stator 254 are engaged. As noted above, this engagement prevents rotation of rotor 252 with respect to stator 254. However, this engagement also prevents rotation of input cam assembly 210 with respect to stator 254 because input cam assembly 210 is coupled to rotor 252 through second output cam assembly 230. When stator 254 is coupled to a fixed support as noted above, the rotation of input cam assembly 210 is effectively stopped.

It should be noted that exceeding either one of the first threshold or the second threshold may engage the same rotor-stator assembly 250 and stop all three cam assemblies. In conventional half system torque brakes, different output cam assemblies use different and independent rotor-stator assemblies, which complicate the design, increase size, weight, and costs, complicate calibration, and cause other issues.

In some embodiments, half system torque brake 200 also includes an adjustment nut 242 threadably coupled to compression shaft 240. The position of adjustment nut 242 on compression shaft 240 controls the first and second thresholds. Both thresholds are controlled at same time by changing the position of the same adjustment nut 242. The threshold values and rates of changing these values during the adjustment operation may be same or different and may depend on designs of the corresponding cam plates as described above.

In some embodiments, half system torque brake 200 includes first thrust bearing 222 disposed between compression shaft 240 and first output cam assembly 220. First thrust bearing 222 is rotatably coupled to compression shaft 240 and first output cam assembly 220 and allows first output cam assembly 220 to rotate with respect to compression shaft 240. At same time, when first output cam assembly 220 is advanced in a direction away from input cam assembly 210 it also pulls compression shaft 240 in same direction and causes compression shaft 240 to advance by same distance. Alternatively, compression shaft 240 may be non-rotatably coupled to first output cam assembly 220 such that rotation of one causes same rotation of the other.

In a similar manner, half system torque brake 200 may include second thrust bearing 232 disposed between pressure plate 258 and adjustment nut 242 threadably coupled to compression shaft 240. Second thrust bearing 232 rotatably engages pressure plate 258 and compression shaft 240 through adjustment nut 242 and allows pressure plate 258 to rotate with respect to compression shaft 240. More generally, second thrust bearing 232 allows rotor-stator assembly 250 to rotate with respect to compression shaft 240. At same time, when adjustment nut 242 advances in a direction toward input cam assembly 210 it also pushes pressure plate 258 in the same direction, resulting in engagement of rotor-stator assembly 250. Alternatively, compression shaft 240 may be fixedly coupled to rotor-stator assembly 250 such that rotation of one causes same rotation of the other. It should be noted that rotor-stator assembly 250 may not rotate around center axis 241 of compression shaft 240 with respect to second output cam plate 234.

In some embodiments, half system torque brake 200 also includes support bearing 218a disposed on an external surface of input cam assembly 210 as, for example, shown in FIGS. 3A and 3B. Support bearing 218a may be used for rotatably coupling half system torque brake 200 to a fixed support. As such, half system torque brake 200 or, more specifically, input cam assembly 210 may rotate with respect to fixed support around center axis 241 of compression shaft 240. In some embodiments, half system torque brake 200 also includes an additional support bearing 218b. For example, a separate support bearing may be provided on different side of input cam assembly 210 or, more specifically, one support bearing may be provided on side of input cam assembly 210 facing first output cam assembly 220, while another support bearing may be provided on opposite side of input cam assembly 210 facing second output cam assembly 230. In some embodiments, one or more support bearing may be attached to compression shaft 240, first output cam assembly 220, second output cam assembly 230, and/or rotor-stator assembly 250 and rotatably couple one or more of the components to fixed support.

FIG. 3F is a schematic cross-sectional view of brake assembly 320 illustrating half system torque brake 200 installed into housing 330 and connected to two output shafts 326 and 328, in accordance with some embodiments. Housing 330 is shown to include first housing half 332 and second housing half 334, separably coupled to each other. First housing half 332 may be separated from second housing half 334 during installation of half system torque brake 200 into housing 330. As shown in this example, housing 330 is coupled first drive pinion 322 of the first driving mechanism and to second drive pinion 324 of the second driving mechanism. Furthermore, first housing half 332 is rotatably coupled to first output shaft 326, while second housing half 334 is rotatably coupled to second output shaft 328. Housing 330 or, more specifically, second housing half 334 (at least in the example shown in FIG. 3F) includes housing spline 336, which slidably but non-rotatably coupled to stator 254 of half system torque brake 200 as described above.

First output cam assembly 220 is coupled to first output shaft 326, such that the torque transferred to first output cam assembly 220 during operation of half system torque brake 200 is further transferred to first output shaft 326. When the rotation of first output cam assembly 220 is stopped, the rotation of first output shaft 326 is also stopped. Likewise, pressure plate 258 is coupled to second output shaft 328, such that the torque transferred to second output cam assembly 230 and pressure plate 258 during operation half system torque brake 200 is further transferred to second output shaft 328. When the rotation of second output cam assembly 230 and pressure plate 258 is stopped, the rotation of first output shaft 326 is also stopped.

Examples of Installation of Half System Torque Brakes

FIG. 4 is a process flowchart corresponding to method 400 for installing a half system torque brake, in accordance with some embodiments. Various examples of half system torque brakes are described above with reference to FIGS. 3A-3D. Specifically, the half system torque brake used in method 400 may include a first output cam assembly, input cam assembly, second output cam assembly, and rotor-stator assembly. All of these assemblies may be disposed on a compression shaft. Specifically, the input cam assembly is disposed between and movably coupled to the first and second output cam assemblies. The rotor-stator assembly is disposed between the second output cam assembly and adjustment nut threadably coupled to the compression shaft. The rotor-stator assembly includes a rotor and stator. Both the rotor and stator are slidably disposed on the compression shaft between the pressure plate and second output cam assembly.

Method 400 may commence with changing the position of the adjustment nut on the compression shaft during operation 402. This position change also changes the distance between the pressure plate of the rotor-stator assembly and the second output cam assembly. Specifically, when the adjustment nut is advanced toward the second output cam assembly, the rotor-stator assembly is compressed, which may increase the first and second torque differential thresholds. On the other hand, when the adjustment nut is advanced away from the second output cam assembly, the rotor-stator assembly is decompressed (allowed to stretch), which may decrease the first and second thresholds. As noted above, the first and second thresholds are adjusted at the same time. During compression and decompression of the rotor-stator assembly, the rotor and stator of this assembly may slide with respect to each other along the center axis of the compression shaft. It should be noted that during operation 402, the half system torque brake is not yet installed into its housing. The adjustment nut is easily accessible during this operation. Furthermore, it should be also noted that any adjustment performed during operation 402 may be later retained and used during actual operation of the half system torque brake, i.e., its operation after installation.

Method 400 may proceed with determining at least one the first threshold and second threshold during operation 404. In some embodiments, both thresholds are determined during this operation. Alternatively, only one threshold may be determined, while the other threshold may be estimated based on the design (symmetric v. asymmetric) of the half system torque brake. The first threshold is associated with the movable coupling between the input cam assembly and first output cam assembly, while the second threshold is associated with the movable coupling between the input cam assembly and second output cam assembly. Changing position of the adjustment nut (e.g., during operation 402) may change the first and second threshold values as described above.

Operation 404 may involve attaching one of the output cam assemblies to a fixed structure and applying a controlled torque (e.g., increasing or gradually increasing torque) to the input cam assembly until the rotor-stator assembly is engaged. The torque at which the rotor-stator assembly engages is a corresponding threshold for this attached output cam assembly. Alternatively, the input cam assembly may be attached to a fixed support during operation 404 while a controlled torque may be applied to one of the output cam assemblies (e.g., one at the time) until the rotor-stator assembly engages.

As shown by decision block 406, changing the adjustment nut position during operation 402 may be repeated based on the values of the first threshold and/or the second threshold obtained during operation 404. Since this position determines the threshold, operation 404 may be also repeated until reaching a desirable value. In general, operation 404 may be performed after each operation 402. Overall, changing the adjustment nut position and determining the threshold values for one or both torque differentials may be repeated until the threshold values are within a predetermined range(s).

In some embodiments, after determining at least one first differential torque threshold and second differential torque threshold during operation 404, method 400 may proceed with installing the half system torque brake into its housing during operation 408. This installation operation 408 may involve slidably but non-rotatably engaging the stator to the housing such that the stator is slidable along the center axis of the compression shaft but not rotatable around this center axis with respect to housing.

Examples of Aircraft Application

Also provided is an aircraft including a driving mechanism, first driven mechanism, second driven mechanism, and half system torque brake. Various examples of some of these components are described above. The driving mechanism may include an electrical motor, a hydraulic motor, or both. The first driven mechanism may include one or more torque tubes and/or or one or more actuators. In some embodiments, the first driven mechanism may include one or more torque brakes. Likewise, the second driven mechanism may include one or more torque tubes, one or more actuators, and/or one or more torque brakes.

Examples of this disclosure may be described in the context of an aircraft manufacturing and service method 1100 as shown in FIG. 5 and aircraft 1102 as shown in FIG. 6. During pre-production, illustrative method 1100 may include specification and design 1104 of the aircraft 1102 and material procurement 1106. During production, component and subassembly manufacturing 1108 and system integration 1110 of aircraft 1102 take place. Specifically, the half system torque brake may tested and installed during system integration 1110 of aircraft 1102. Thereafter, aircraft 1102 may go through certification and delivery 1112 to be placed in service 1114. While in service by a customer, aircraft 1102 is scheduled for routine maintenance and service 1116 (which may also include modification, reconfiguration, refurbishment, and so on).

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 6, aircraft 1102 produced may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus and methods shown or described herein may be employed during any one or more of the stages of the aircraft manufacturing and service method 1100. For example, components or subassemblies corresponding to component and subassembly manufacturing 1108 may be fabricated or manufactured in a manner similar to components or subassemblies produced while aircraft 1102 is in service. Also, one or more aspects of the apparatus, method, or combination thereof may be utilized during operations 1108 and 1110, for example, by substantially expediting assembly of or reducing the cost of aircraft 1102. Similarly, one or more aspects of the apparatus or method realizations, or a combination thereof, may be utilized, for example and without limitation, while aircraft 1102 is in service, e.g., maintenance and service 1116.

CONCLUSION

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

What is claimed is:

1. A half system torque brake for use with a first driven mechanism and a second driven mechanism, the half system torque brake comprising:
    a compression shaft having a center axis;
    an input cam assembly slidably disposed on the compression shaft and associated with a driving mechanism;
    a first output cam assembly disposed on the compression shaft and movably coupled to the input cam assembly, wherein the first output cam assembly is associated with the first driven mechanism;
    a second output cam assembly slidably disposed on the compression shaft and movably coupled to the input cam assembly, wherein the second output cam assembly is associated with the second driven mechanism; and
    a rotor-stator assembly disposed on the compression shaft such that the second output cam assembly is disposed between the input cam assembly and the rotor-stator assembly, wherein the rotor-stator assembly comprises a rotor, a stator, and a pressure plate for engaging the rotor and the stator while compressing the rotor and the stator between the pressure plate and the second output cam assembly.

2. The half system torque brake of claim 1, wherein, when a first torque differential between the input cam assembly and the first output cam assembly exceeds a first threshold or when a second torque differential between the input cam assembly and the second output cam assembly exceeds a second threshold, the rotor and the stator are engaged thereby preventing rotation of the rotor and the input cam assembly with respect to the stator.

3. The half system torque brake of claim 1, wherein the rotor is fixedly coupled to the second output cam assembly, and wherein the stator is associated with a fixed support for the half system torque brake.

4. The half system torque brake of claim 1,
    wherein the first output cam assembly comprises a first output cam plate having three or more first output cam channels,
        wherein each of the three or more first output cam channels comprises a deep channel portion and a shallow channel portion,
        wherein one first ball of a first ball set is positioned in each of the three or more first output cam channels such that the one first ball continuously contacts the input cam assembly and the first output cam plate,
    wherein the second output cam assembly comprises a second output cam plate having three or more second output cam channels, each of the three or more second output cam channels comprising a deep channel portion and a shallow channel portion, wherein one second ball of a second ball set is positioned in each of the three or more second output cam channels such that the one second ball continuously contacts the input cam assembly and the second output cam plate, and wherein when the one first ball is in the deep channel portion and when the one second ball is in the deep channel portion, the rotor and the stator are disengaged, and when the one first ball is in the shallow channel portion or when the one second ball is in the shallow channel portion, the rotor and the stator are engaged.

5. The half system torque brake of claim 1, wherein the input cam assembly is disposed between the first output cam assembly and the second output cam assembly.

6. The half system torque brake of claim 1, wherein the input cam assembly comprises a drive gear coupled to a first input cam plate and a second input cam plate using a shock absorbing spring pack, wherein the shock absorbing spring pack is operable to absorb a shock by allowing the drive gear to continue turning for a limited angle after the rotor engages the stator.

7. The half system torque brake of claim 2, the first threshold of the first torque differential is equal to the second threshold of the second torque differential.

8. The half system torque brake of claim 2, the first threshold of the first torque differential is greater than the second threshold of the second torque differential.

9. The half system torque brake claim 2, further comprising an adjustment nut threadably coupled to the compression shaft, wherein position of the adjustment nut on the compression shaft controls the first threshold of the first torque differential and the second threshold of the second torque differential.

10. The half system torque brake of claim 1, further comprising a biasing mechanism disposed between the second output cam assembly and the pressure plate and forcing the second output cam assembly away from the pressure plate.

11. The half system torque brake of claim 10, wherein the biasing mechanism is a Belleville spring.

12. The half system torque brake of claim 1, further comprising a first thrust bearing disposed between the compression shaft and the first output cam assembly and rotatably engaging the compression shaft and the first output cam assembly.

13. The half system torque brake of claim 1, further comprising a second thrust bearing disposed between the pressure plate and an adjustment nut threadably coupled to the compression shaft, wherein the second thrust bearing rotatably engages the pressure plate and the compression shaft through the adjustment nut.

14. The half system torque brake of claim 1, further comprising a support bearing disposed on an external surface of the input cam assembly for rotatably engaging the half system torque brake to a fixed support.

15. The half system torque brake of claim 1, wherein each of the input cam assembly, the first output cam assembly, and the second output cam assembly are rotatably disposed on the compression shaft.

16. The half system torque brake of claim 15, wherein the compression shaft is slidably coupled to the stator such that the stator is slidable along the center axis of the compression shaft between the first output cam assembly and the pressure plate and such that the stator is not rotatable around the center axis of the compression shaft with respect to the compression shaft.

17. The half system torque brake of claim 1, wherein the stator comprises a tooth for slidably engaging with a fixed support such that the stator is slidable along the center axis of the compression shaft between the first output cam assembly and the pressure plate and such that the stator is not rotatable around the center axis of the compression shaft with respect to the fixed support.

18. The half system torque brake of claim 1, wherein the compression shaft is slidably supported by the input cam assembly such that the compression shaft is movable with respect to the input cam assembly in a direction along the center axis of the compression shaft.

19. An aircraft comprising:
a driving mechanism;
a first driven mechanism;
a second driven mechanism; and
a half system torque brake comprising:
a compression shaft having a center axis;
an input cam assembly slidably disposed on the compression shaft and associated with the driving mechanism;
a first output cam assembly disposed on the compression shaft and movably coupled to the input cam assembly, wherein the first output cam assembly is associated with the first driven mechanism;
a second output cam assembly slidably disposed on the compression shaft and movably coupled to the input cam assembly,
wherein the second output cam assembly is associated with the second driven mechanism; and
a rotor-stator assembly disposed on the compression shaft such that the second output cam assembly is disposed between the input cam assembly and the rotor-stator assembly, wherein the rotor-stator assembly comprises a rotor, a stator, and a pressure plate for engaging the rotor and the stator while compressing the rotor and the stator between the pressure plate and the second output cam assembly.

20. A method of installing a half system torque brake, the method comprising:
changing a position of an adjustment nut on a compression shaft of the half system torque brake,
wherein the half system torque brake comprises a first output cam assembly, an input cam assembly, a second output cam assembly, and a rotor-stator assembly disposed on the compression shaft such that the input cam assembly is disposed between and movably coupled to the first output cam assembly and the second output cam assembly and such that the rotor-stator assembly is disposed between the second output cam assembly and the adjustment nut,
wherein changing the position of the adjustment nut changes a distance between a pressure plate of the rotor-stator assembly and the second output cam assembly and changes a first threshold for a first torque differential and a second threshold for a second torque differential,
wherein a rotor and a stator of the rotor-stator assembly are slidably disposed on the compression shaft between the pressure plate and the second output cam assembly;
determining at least one of the first threshold for the first torque differential and the second threshold for the second torque differential, wherein the first threshold is associated with the movable coupling between the input cam assembly and the first output cam assembly, and wherein the second threshold is associated with the movable coupling between the input cam assembly and the second output cam assembly; and after determining the at least one of the first differential torque threshold and the second differential torque threshold, installing the half system torque brake into a housing, wherein installing comprises slidably engaging the stator to the housing such that the stator is slidable along the center axis of the compression shaft between the first output cam assembly and the pressure plate and such that the stator is not rotatable around the center axis of the compression shaft with respect to the housing.

* * * * *